Dec. 30, 1969  H. GREENTREE  3,486,799
TRAILER BRAKE CONTROL SYSTEM
Filed July 11, 1968  5 Sheets-Sheet 1
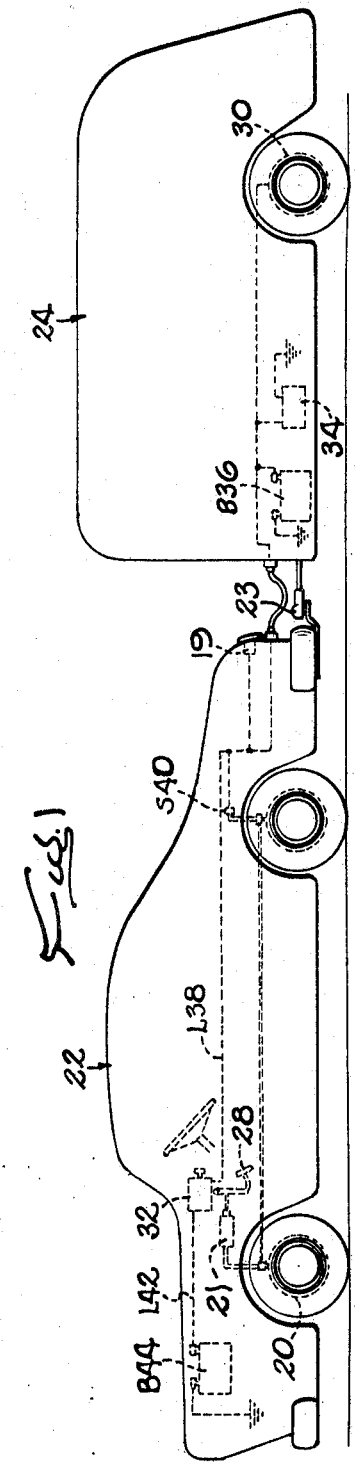
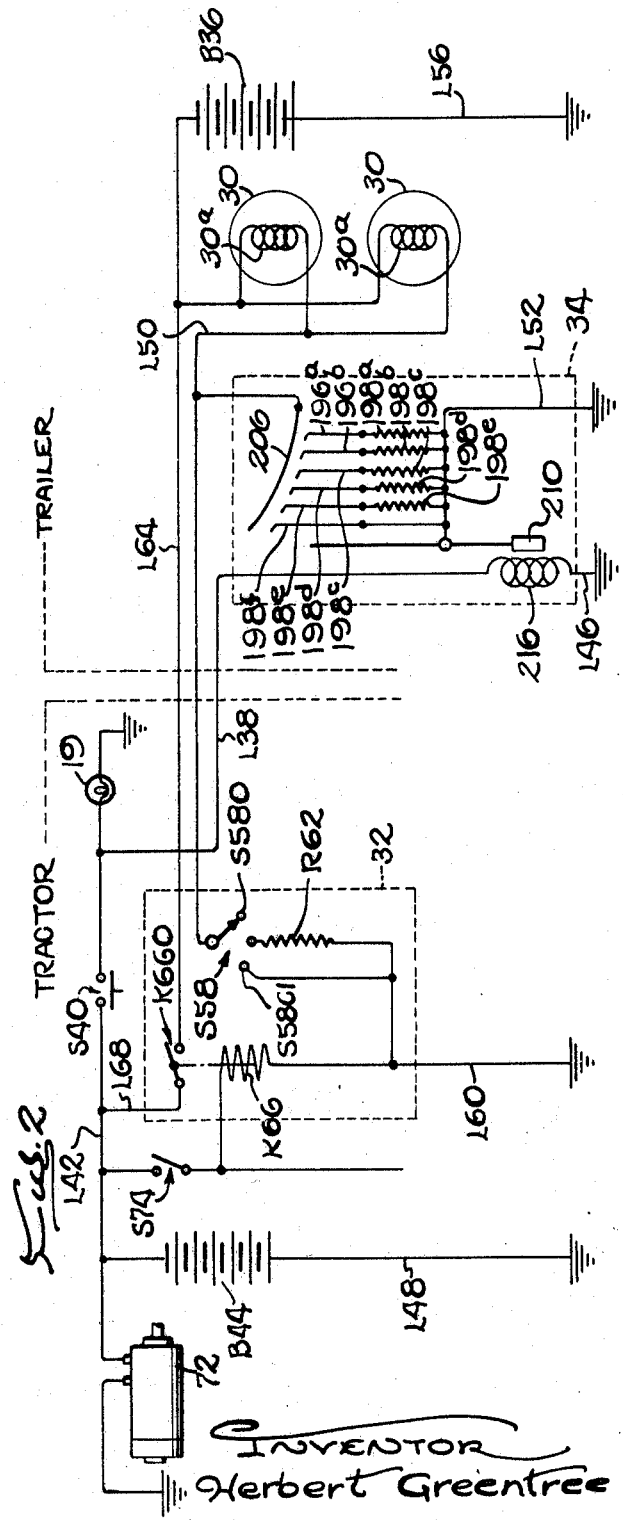
INVENTOR
Herbert Greentree
by Wolfe, Hubbard, Voit & Osann
ATTORNEY

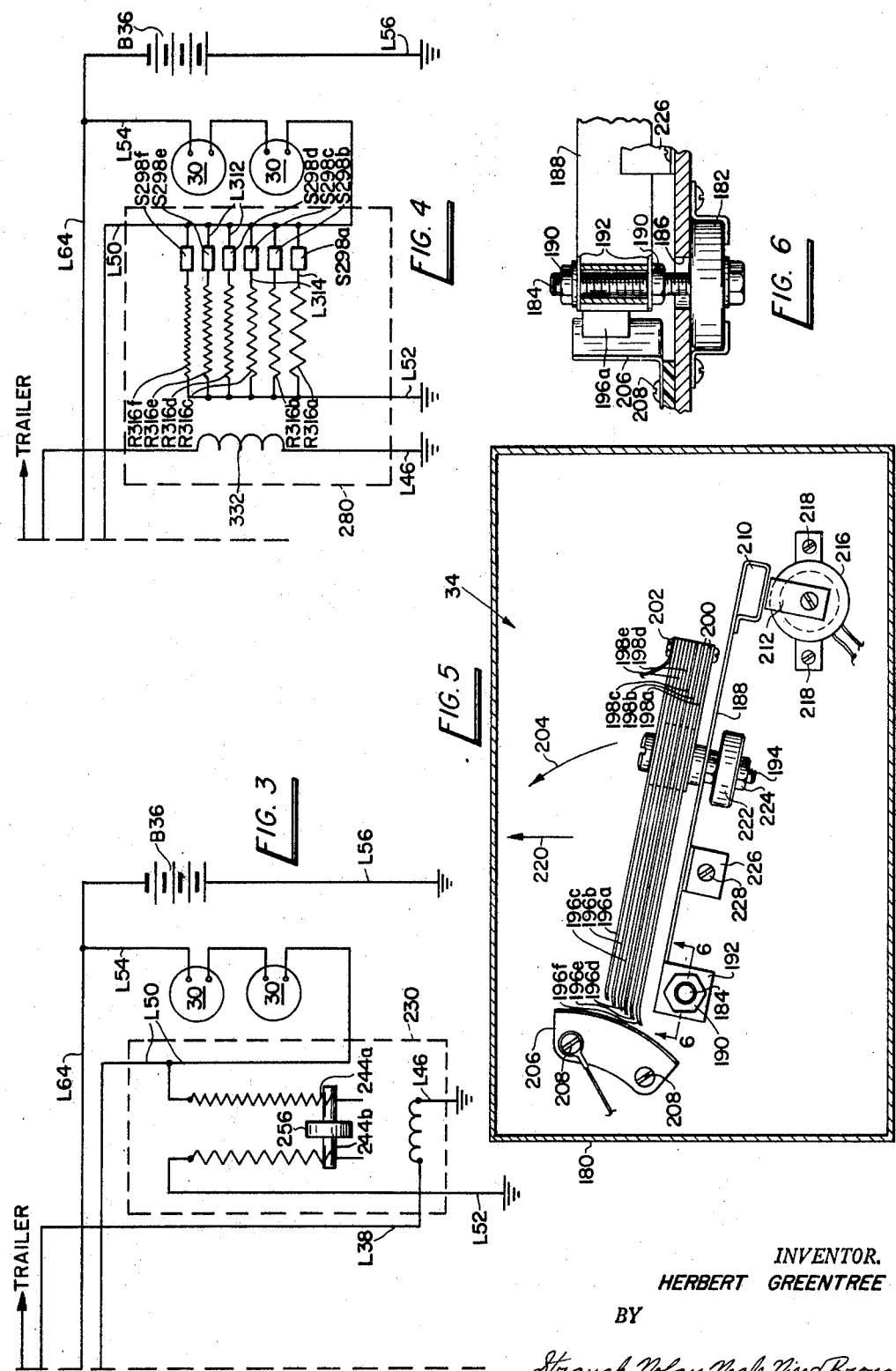

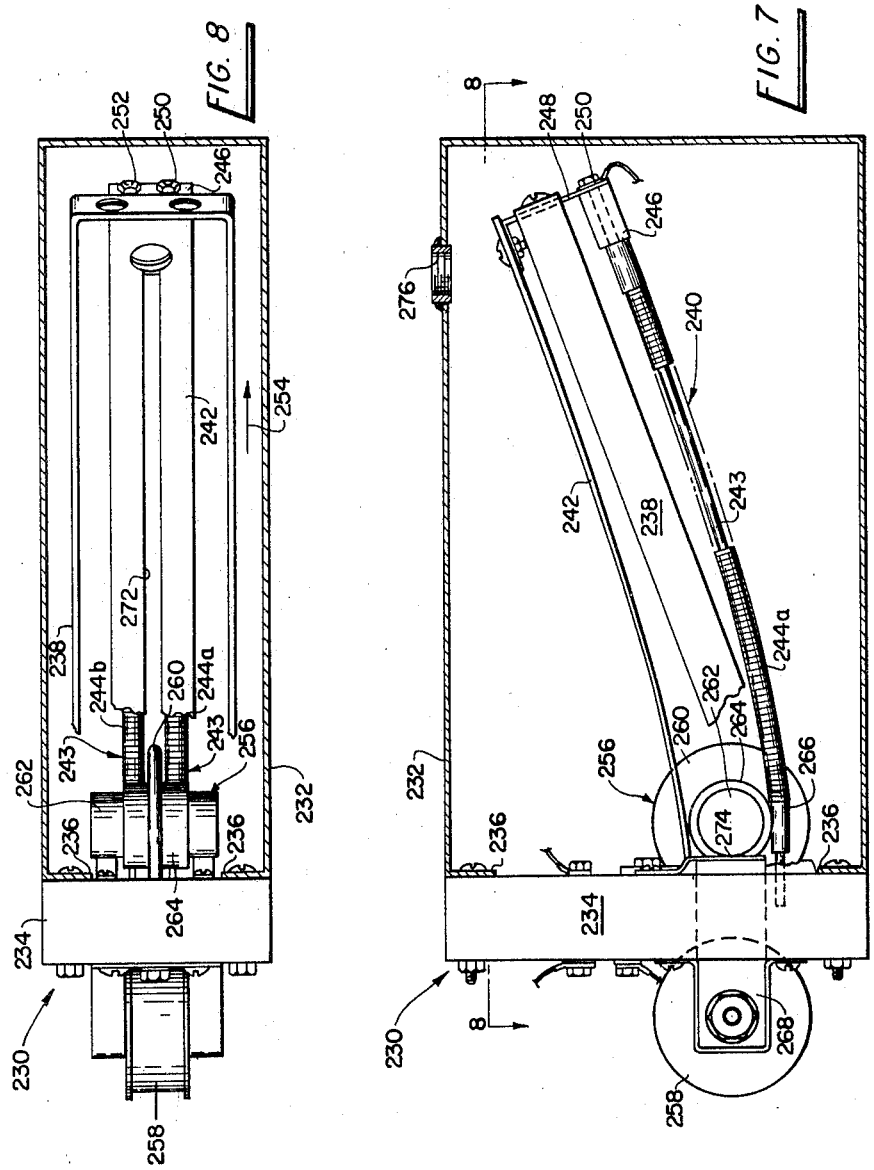

Dec. 30, 1969    H. GREENTREE    3,486,799
TRAILER BRAKE CONTROL SYSTEM
Filed July 11, 1968    5 Sheets-Sheet 4
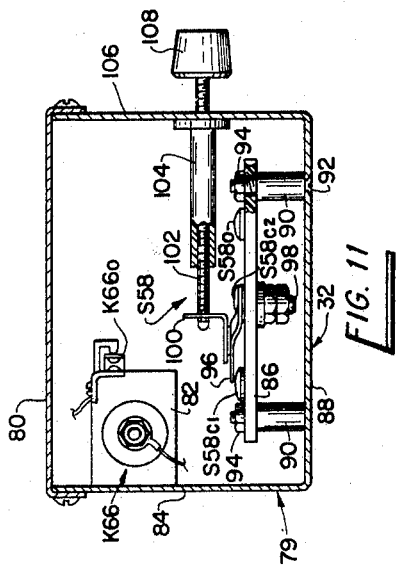
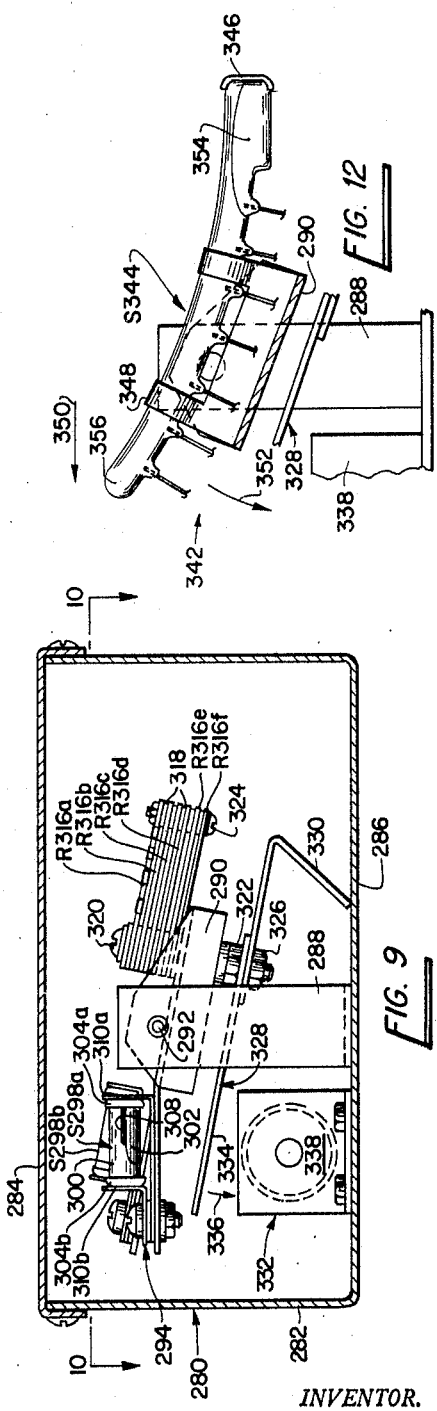
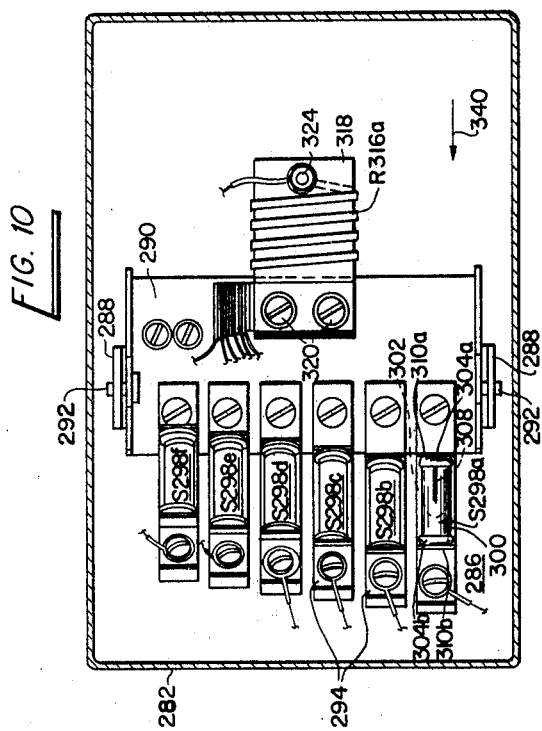
INVENTOR.
HERBERT GREENTREE
BY
Strauch, Nolan, Neale, Nies & Bronaugh
ATTORNEYS

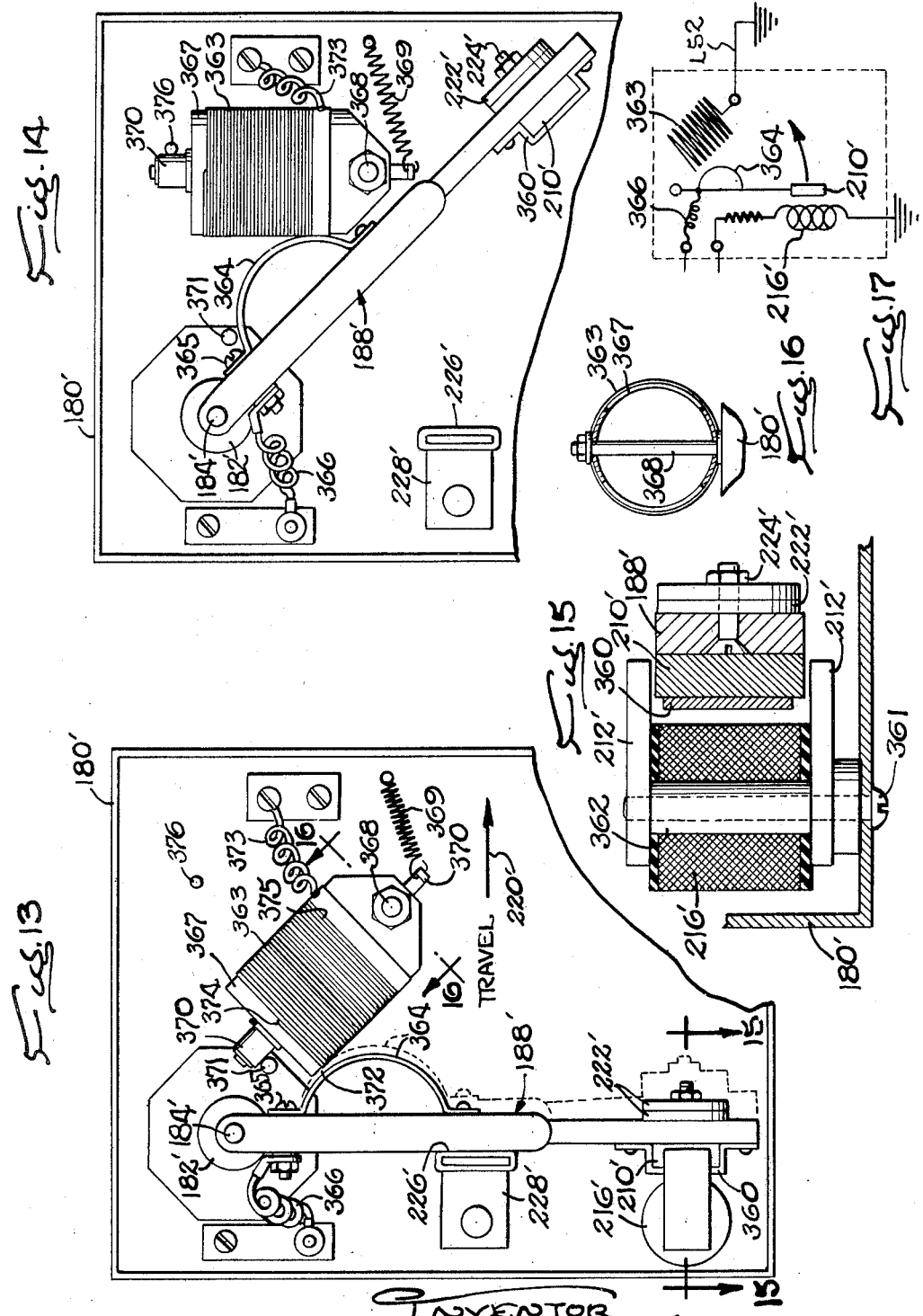

United States Patent Office 3,486,799
Patented Dec. 30, 1969

3,486,799
TRAILER BRAKE CONTROL SYSTEM
Herbert Greentree, Lake Worth, Fla. (% Warner Electric Brake and Clutch Company, Beloit, Wis. 53512)
Continuation-in-part of application Ser. No. 568,017, July 26, 1966. This application July 11, 1968, Ser. No. 764,976
Int. Cl. B60t 13/74, 8/18
U.S. Cl. 303—7                                    37 Claims

ABSTRACT OF THE DISCLOSURE

The electrically controlled trailer brakes of a tractor-trailer road vehicle are applied in response to closure of the stoplight switch of the tractor, the retarding force as the deceleration continues being proportional to the prevailing rate of deceleration of the vehicle. Such rate is determined by a sensor having an inertia member movable, as the deceleration increases, away from a normal inactive position in which the member is held until the tractor stop switch is closed or some other emergency occurs such as breaking of the trailer away from the tractor or failure of the stop switch circuit.

CROSS-REFERENCE TO RELATED APPLICATION

This application is a continuation-in-part of my application Ser. No. 568,017, filed July 26, 1966.

BACKGROUND OF THE INVENTION

The invention relates to a control of the general character disclosed in Patent 3,053,348 for applying the brakes of a trailer as an incident to application of the brakes on the towing vehicle or tractor, the energization of the trailer brakes being varied in proportion to the rate of deceleration of the tractor-trailer as determined by an inertia member movably mounted on the vehicle.

SUMMARY OF THE INVENTION

The present invention aims to improve the safety and durability of operation of the trailer brakes of a tractor-trailer in a control of the above character by insuring continued release of the trailer brakes during normal vehicle travel even on rough roadways and for applying these brakes under abnormal or emergency conditions such as breaking of the trailer away from the tractor, failure of the tractor stoplight switch or its circuitry, etc. These objectives are achieved by incorporating in the deceleration sensor a novel means for positively maintaining the same disabled until the tractor brakes are applied and then to apply the trailer brakes simultaneously while increasing the retarding effect as the vehicle deceleration rate increases. The means for holding the deceleration sensor inactive is releasable automatically normally by energization of an electromagnet but also independently of the tractor stop switch so as to effect application of the trailer brakes in the event of break-away of the trailer or other failure of the tractor brake control system.

BRIEF DESCRIPTION OF THE DRAWINGS

FIGURE 1 is a generally diagrammatic side view of a tractor-trailer vehicle equipped with a trailer brake control system embodying the novel features of the present invention.

FIG. 2 is a schematic wiring diagram of one embodiment of the improved trailer brake control system.

FIG. 3 is a partial schematic wiring diagram of a second form of trailer brake control system.

FIG. 4 is a view, similar to FIG. 3 of a third form of trailer brake control system.

FIG. 5 is a plan view of a deceleration responsive control component incorporated in the trailer brake control system of FIG. 2.

FIG. 6 is a section along the line 6—6 and through the control component of FIG. 5.

FIG. 7 is a partly sectioned side view of a deceleration responsive control component incorporating the trailer brake control system of FIG. 3.

FIG. 8 is a partly sectioned plan view of the deceleration responsive control component of FIG. 7.

FIG. 9 is a partly sectioned plan view of a deceleration responsive control component employed in the trailer brake control system of FIG. 4.

FIG. 10 is a partly sectioned plan view of the control component of FIG. 9.

FIG. 11 is a partly sectioned side view of a unitized assembly mounted in the tractor of a tractor-trailer vehicle equipped with trailer brake control systems of the type illustrated in FIGS. 2–4.

FIG. 12 is a partial side view of an alternate form of deceleration responsive control component which may be employed in the trailer brake control system of FIG. 4.

FIGS. 13 and 14 are plan views of an improved form of the controller shown in FIG. 5, the parts being shown in different positions.

FIGS. 15 and 16 are fragmentary sections taken along the lines 15—15 and 16—16 of FIG. 13.

FIG. 17 is a wiring diagram for the control unit shown in FIGS. 13 and 14.

DESCRIPTION OF THE PREFERRED EMBODIMENTS

In FIGS. 1 and 2 the improved trailer brake control system 26 is incorporated in a tractor-trailer vehicle comprising an automobile 22 and a house trailer 24 coupled detachably to the tractor by a conventional ball and socket coupling 23. The tractor is equipped with conventional brakes 20 energized from a master cylinder 21 in response to depression of a pedal 28 whose initial motion away from the brake-released position closes the usual switch S40 in a circuit L42, L38 for energizing a usual stoplight 19 in the usual way from the tractor battery B44.

The wheels of the trailer are equipped with brakes 30 preferably of the friction type capable of producing a retarding force proportional to the degree of energization of windings 30a adapted to be energized, preferably from an independent power source comprising in this instance a battery B36 mounted on the trailer and adapted to be charged by the same generator 72 which is driven by the tractor engine and charges the tractor battery B44. The batteries are preferably connected in parallel thus permitting the use of a generator of lower output capacity. The circuit for charging the trailer battery is controlled by the conventional ignition switch S74 on the tractor. For this purpose, one side of the battery B36 is connected through a lead L64 to one contact K66o of a relay K66 incorporated in a unit 32 (FIGS. 1 and 11) accessible to the tractor driver as by being mounted on the steering column of the tractor. The opposite contact of the switch K66o is connected through leads L68 and L42 to the battery B44 which is connected to the generator through conventional protective devices including a voltage regulator (not shown).

Relay K66, together with emergency switch S58 to be described later, may be housed in a single unitary assembly 32 (FIG. 11) including a casing 79 with a removable cover 80 supported by a bracket 82 attached to casing side wall 84. The switch S58 includes an insulated plate 86 separated from casing bottom wall 88 by spacers 90 and fixed to it by screws 92 and nuts 94. Mounted on insulated plate 86 are open contact S58o, contact S58c1, which is in an emergency braking circuit and contact S58c2, which is in the brake testing circuit. Switch S58 also includes a conductive blade 96 fastened to insulated plate 86 by a pivot screw 98 which is also the terminal for lead L50 (see FIG. 2). Switch blade 96 is connected through an L-shaped link 100 to an actuator 102 which extends through a tubular guide 104 and the side wall 106 of housing 79. A control knob 108 is fastened to the outer end of actuator 102 so that the operator of the towing vehicle may move switch member 96 from one to another of the switch contacts S58o or S58c1.

During normal travel of the coupled tractor-trailer vehicle along a roadway, the present invention contemplates applying the trailer brakes automatically when the brake pedal 28 is depressed to apply the tractor brakes and then continuing the energization of the trailer brakes to produce a retarding force which increases and decreases with the deceleration of the vehicle so long as the tractor brakes remain applied. This is accomplished herein by connecting a deceleration responsive trailer brake control component or unit 34 through lead L38 to one side of the spotlight switch S40 on the tractor. As shown in FIG. 2, the other contact of the spotlight switch is connected through lead L42 to the battery B44 of the tractor. Accordingly, when brake pedal 28 is depressed to close stoplight switch S40, a circuit is completed from one side of battery B44 through lead L42, switch S40, and lead L38 to the control unit 34 which is connected to the opposite side of battery B44 by ground leads. Completion of this circuit through windings of the brakes 30 energizes the latter to produce a braking effect, the magnitude of which is proportioned to the rate of deceleration of tractor-trailer as determined by the control unit 34.

Provision is also made for overriding the deceleration responsive control unit 34 and applying trailer brakes 30 at a maximum rate regardless of the rate of deceleration of the trailer in "panic stops" or other emergency situations. This is accomplished by the driver of the tractor by moving a normally open emergency switch S58 from contact S58o to contact S58c1. As shown in FIG. 2, this completes a circuit from one side of battery B36 through lead L54, trailer brakes 30, lead L50, switch S58, and lead L60 to the opposite side of the battery. The foregoing circuit is constructed so that its resistance is relatively low. Therefore, maximum power is supplied to brakes 30 and the latter are applied to the maximum extent when the emergency switch is closed.

Emergency switch S58 may also preferably be provided with a second closed contact S58c2 which is connected through resistor R62 to lead L60. The foregoing components are provided for checking trailer brakes 30 to insure that they are in operating condition. Specifically, by moving switch S58 to contact S58c2, a circuit is completed from one side of battery B36 through lead L54, trailer brakes 30, lead L50, switch S58, resistor R62, and lead L60 to the other side of the battery. This energizes the brake actuators causing the trailer brakes to be applied. Accordingly, the operator of the tractor may move switch S58 to its S58c2 contact and then move the towing vehicle 22 forward. If this results in a definite drag on the tractor, the brakes 30 are in operating order. The resistor R62 is included in this circuit to reduce the power supplied to brakes 30 so that they will not be applied to the maximum extent during the testing cycle just discussed thus preventing unnecessary wear and tear on trailer 24 and on towing vehicle 22.

In accordance with the present invention, the deceleration sensing unit 32 differs substantially from the sensors of the prior art both in construction and mode of operation so as to achieve greater safety and reliability during operation of the tractor-trailer vehicle under both normal and abnormal or emergency conditions. Generally stated, the sensor includes an inertia member mounted on the vehicle for movement longitudinally thereof with increases and decreases in the rate of vehicle deceleration above a predetermined value. Normally, the sensor is held inactive under a positive biasing force and thus is insensitive to normal road shocks but is activated as an incident to application of the tractor brakes and by closure of the spotlight switch S40 so that the inertia member is forced out of the normal position to condition the sensor for energizing the trailer brakes in accordance with the prevailing rate of deceleration of the vehicle resulting from application of the tractor brakes. More specifically, the inertia member is biased toward and held in abutment with a stop during normal travel of the vehicle and is released and forced away from the stop to effect a light application of the trailer brakes in response to closure of the stop switch S40 and application of the tractor brakes. Also, the biasing force acting on the inertia member is limited so that the member may become released independently of the stop switch closure in the event of failure of the stop switch or its circuitry or breaking of the trailer away from the tractor.

The deceleration sensor operable in the manner above described may take various forms, typical examples of which are shown in FIGS. 5 and 6, FIGS. 3, 7 and 8, FIGS. 4, 7 and 8, FIGS. 9 and 10, FIG. 12 and FIGS. 13 and 14. In FIGS. 5 and 6, the inertia member of the sensor comprises an elongated and weighted arm 188 fulcrumed at one end on a pivot 184 upstanding from the horizontal bottom of a housing 180 in which the operating parts of the sensor 34 are enclosed. Flanges 192 on the arm 188 are attached by nuts 190 to the pivot shaft 184 which is fixed to the inner race ring of a ball bearing 182 mounted on the under side of the housing bottom. The housing 180 is secured to a part of the trailer in a position such that the arm extends transversely of the direction of travel of the vehicle indicated by the arrow 220 in FIG. 5. In this position, the arm 188, due to its own weight supplemented by a weight 222 thereon, tends to swing horizontally in the direction of the arrow 204, when the tractor-trailer is decelerating, the magnitude of this force being proportional to the rate of deceleration. The weight is secured to the arm by a nut 224.

Bolts 194 (only one of which is shown in FIG. 5) extend through the arm 188 intermediate the ends thereof and clamp one end of each of a series of successively shorter contact strips 196a–f against the ends of corresponding resistors 198a–e of progressively decreasing resistances. The resistor ends are insulated from each other by blocks 200. The ends of the resistors R198a–e opposite the contacts 196a–e and at the end of the contact 196f are connected by a common terminal 202 to lead L52 (FIG. 2) which is grounded and thus extends to the battery B36.

The contacts comprise flat and parallel strips of resilient metal projecting cantilever fashion from points of anchorage formed by the bolts 194. The free ends of the strips are bent slightly for proper engagement, first the shortest 196a and then 196b–f successively, with the surface of a fixed contact 206 as the arm is swung, as indicated by the arrow 204 in FIG. 2, counter-clockwise from the inactive position (FIG. 5). The contact 206 is secured to the housing 180 with its arcuate surface facing the ends of the contact strips. Leads L50 and L54 connect the contact 206 to the trailer brake windings and through the latter to the battery B36. Thus, with one or more of the strips engaging the fixed contact 206, the circuit above described will be completed to activate the trailer brakes and produce a retarding force proportional to the number of the parallel resistors then included in the circuit as determined by the position of the arm 188 and therefore the prevailing rate of deceleration of the vehicle.

It will be observed that the resiliency of the contact strips 196 exerts a force opposing the force due to the inertia of the arm 188 during deceleration of the vehicle such spring force being determined by the number of the strips which are engaged and bent laterally. As the vehicle deceleration decreases, the spring force becomes effective to swing the arm reversely to a position at zero deceleration where only the last and longest strip 196f is in engagement with the contact 206, the trailer brakes then being deenergized.

In accordance with an important feature of the present invention, provision is made for exerting on the inertia member 188 when it reaches the brake-released position, a biasing force which moves the member a short distance in the counter-clockwise direction to insure carrying the contact strip 196f out of engagement with contact 206, this movement being limited by abutment of the arm 188 with a stop 226 upstanding from the bottom of the housing 180 and secured thereto by a screw 228. In the form shown in FIG. 5, this biasing force is supplied by a permanent magnet 210 extending crosswise of the free end of the arm and secured to the latter as by the encircling strap shown in FIG. 5. End portions of the permanent magnet extend across the ends of parallel pole pieces 212 at opposite ends of the core of an electromagnet having a coil 216 surrounding the core and supported by a suitable bracket secured to the bottom of the housing by screws 218. With the coil deenergized, the flux of the permanent magnet threads the polepieces 212 and the connecting core thus drawing the arm 188 to and holding the same against the stop 226. In this position of the arm, the ends of all of the contact strips 196 are out of engagement with the fixed contact 206 so that leads L50 and L52 are disconnected and the trailer brakes are maintained released. However, when brake pedal 28 is depressed to apply the tractor brakes closing stoplight switch S40, a circuit is completed from one side of battery B44 through lead L42, switch S40, lead L38, electromagnet 216 and leads L46 and L48 to the opposite side of the battery. This energizes electromagnet 216, which is so wired that its polarity is the same as that of permanent magnet 210. Accordingly, when stoplight switch S40 is closed, electromagnet 216 repels permanent magnet and overcomes the biasing force thereof thus forcing the arm 188 away from the stop 226 in the direction of arrow 204. The components of control 34 are dimensioned so that the repelling force of the electromagnet is sufficient to swing the arm 188 counter-clockwise from the FIG. 5 position a distance sufficient to engage the first flexible contact 196a with fixed contact 206. Since this contact is connected to resistor R198a, which has the highest resistance, a minimum amount of power is supplied to trailer brakes 30, thus applying these brakes to the minimum extent.

If, after such initial engagement of the strip 196a with the contact 206, the deceleration rate of the vehicle increases, the arm 188 will be swung ahead further in the counter-clockwise direction and successive ones of the strips 196b–f will engage the contact 206, each engagement decreasing the total resistance of the trailer brake circuit. Accordingly, as the rate of deceleration of the tractor-trailer and the proportional displacement of arm 188 increase, there is a corresponding increase in the power supplied to the trailer brakes 30 and a corresponding increase in the degree of braking provided by the trailer brakes.

Conversely, as the rate of deceleration decreases, the arm 188 swings reversely so that the flexible contacts providing the lower resistance paths become disengaged from fixed contact 206 thus decreasing the power supplied to the trailer brakes and therefore the magnitude of the braking effect. However, as long as the brake pedal 28 of the towing vehicle remains depressed and stoplight switch S40 closed, the repelling force between magnets 210 and 216 maintain the flexible contact 196a in engagement with fixed contact 206 so that the trailer brakes are energized and applied to a minimum extent until the brake pedal 28 is released.

As shown in FIG. 5, the stop 226 is fixed to housing 180 to engage the arm 188 and maintains a slight separation between permanent magnet 210 and pole pieces 212 when pivot arm 188 is in its inoperative position. This is an important safety feature of the present invention. Specifically, this separation reduces the attractive force between the permanent magnet and pole pieces 212 to such an extent that, if there is a deceleration of the trailer above a predetermined magnitude, the inertia of the arm overcomes the attractive force between the permanent magnet and pole pieces producing pivoting the arm 188 in the direction of arrow 204 to apply the trailer brakes regardless of whether stoplight switch S40 is closed. This insures that the trailer brakes will function properly even in the event of a failure in the stoplight circuit or in an emergency situation in which for some reason the brakes of the tractor are not applied. Stop 226 is adjusted so that the gap between magnet 210 and pole pieces 212 will not reduce the force therebetween to such an extent that bumps and other irregularities in the surface over which the trailer travels will cause arm 188 to swing away from its inoperative position and energize the trailer brakes.

Another important advantage of the arrangement just described is that tilting of housing 180 to an inclination such as would occur in a "break away" of the trailer will allow inertia to overcome the attractive force between magnet 210 and pole pieces 212 and displace the arm 188 in the direction of arrow 204 to apply the trailer brakes.

The counterweight 222 is preferably employed to assist in proportioning the displacement of pivot arm 188 to the rate of deceleration of trailer 24. To smooth out irregularities in the movement of pivot arm 188, the ball bearing 182 in which pivot shaft 184 is journaled is preferably packed with a heavy grease to produce a damping effect on the movement of the pivot arm.

FIGS. 7 and 8 of the drawing illustrate a second form of deceleration responsive control 230, which may be employed in trailer brake control systems of the type described above. As shown by the fragmentary circuit diagram of FIG. 3, deceleration responsive control 230 may be directly substituted for the deceleration responsive control 34 in the trailer brake control system 26 of FIG. 2.

Deceleration responsive control 230 includes an open-ended fluid-tight casing or housing 232 and a removable end wall or member 234 bolted to flanges 236 at the open end of the casing. Bolted or o'herwise fixed to end member 234 is a generally U-shaped, upwardly inclined bracket 238, which extends substantially the length of casing 232. Supported from end member 234 and bracket 238 are a track 240 and an upper guide 242. Track 240 consists of two laterally spaced and parallel rails 243, around each of which a resistor R144a or R144b is wound. The rails are inclined upwardly from their lower ends which extend into and are supported by end wall 234. The upper, forward ends of the rails extend into a terminal block 246, which is supported from the forward end of bracket 238 by a second, depending bracket 248. As is best shown in FIGS. 3 and 7, terminal block 246 carries a terminal 250 to which lead L50 and resistor R244a are connected, thereby connecting resistor R244a in series with trailer brakes 30 and battery B36. The second resistor R244b and lead L52 are connected to a second terminal 252 on terminal block 246, thereby putting resistor R244b in series with resistor R244a and battery G36.

The deceleration responsive unit 230 is mounted in trailer 24 so that the arrow 254 in FIG. 8 points toward the front of the trailer and the track formed by the resistors 244a and b opens upwardly. The rails 243 are preferably of arcuate curvature as shown in FIG. 7. being inclined very gradually at the lower ends 266, the slope then increasing progressively along the lower end portions of the resistors and remaining substantially constant along the upper half thereof. With the deceleration responsive control thus shaped and mounted in the trailer, continuity is established between resistors R244a and R244b to supply power to trailer brakes 30 when brake pedal 28 of the tractor brakes are applied by a deceleration responsive roller 256 and a horizontally disposed electromagnet 258 which is mounted on the housing end wall 234 opposite the lower end of the resistor track. Roller 256 has a central flange 260 mounted on an axle 262 and composed of permanent magnet material. A conductive sleeve 264 surrounding the axle 262 and extending through flange 260 is provided for electrically connecting resistor 244a to resistor 244b. The guide 242 corresponds in curvature to the rails 243 and is spaced close to the top of the sleeve 264 so as to hold the latter close to the resistors as it rolls up and down the track. Bouncing of the sleeve away from the resistors is prevented and proper contact is maintained at all times despite roughness of the roadway being traveled.

Normally, the roller is in the position shown in FIG. 7 in which axle 262 and sleeve 264 rest upon short sections 266 of rails 243 which are free of resistors 244a and b. Consequently, with roller 256 in its normal position, there is no connection between these resistors and the circuit to trailer brake 30 is interrupted. When the vehicle is not decelerating above a predetermined rate, the roller 256 is maintained in this normal position by the attraction of the permanent magnet 262 to the free ends of the pole pieces 268 of the deenergized electromagnet 258.

Roller 256 is forced away from pole pieces 266 and into contact with the lower ends of resistors R244a and b when the tractor brake pedal 28 is depressed and the electromagnet 258 is energized. Specifically, as shown in FIG. 3, the electromagnet 258 is connected between the leads L46 and L38 described previously (see FIG. 2). Accordingly, when the brake pedal 28 is depressed, a circuit is completed from one side of battery B44 through lead L42, stoplight switch S40, lead L38, electromagnet 258, and leads L46 and L48 to the opposite side of the battery, energizing the electromagnet. Electromagnet 258 has the same polarity as permanent magnet 262. Accordingly, when electromagnet 258 is energized, the force of repulsion between it and permanent magnet 262 forces roller 256 away from pole pieces 268 upwardly along the rail ends 266 and into contact with resistors R244a and b.

This completes a circuit from one side of battery B36 through lead L54, trailer brakes 30, lead L50, resistor R244a, conductive sleeve 264, resistor R244b, and leads L46 and L56 to the opposite side of the battery, energizing trailer brakes 30. At this point, roller 256 is in the position shown in FIG. 3 so that there is maximum resistance in the brake-actuating circuit and a minimum supply of power to brakes 30. Accordingly, there is only a mild braking effect at this point.

As the rate of deceleration of trailer 24 increases, the forces of inertia displace roller 256 upwardly along track 240 in the direction indicated by arrow 254 in FIG. 8, the roller being guided in this movement by the two rails 243 of track 240 and by upper guide rail 242 which is provided with an elongated slot 272 (see FIG. 8) through which flange 260 of roller 256 extends. This shorts out increasingly longer sections of resistors R244a and b, thus decreasing the resistance in the brake-actuating circuit. This increases the power applied to the trailer brakes and, consequently, the braking effect produced by the latter.

Conversely, as the rate of deceleration decreases, gravity moves roller 256 back toward its inoperative position, increasing the resistance in the braking circuit and, consequently, decreasing the braking effect. By properly configuring rails 243 and mounting them at the appropriate angle in casing 232, the displacement of roller 256 can be made to closely match the application of brakes 30 to the rate of deceleration of trailer 24.

When the force on brake pedal 28 in tractor 22 is released and there is no danger of overrun, the stoplight switch S40 opens with the release of the tractor brake pedal and the circuit connecting electromagnet 258 to battery B44 is interrupted, deenergizing the electromagnet. At this point, the force of attraction of pole pieces 268 for permanent magnet 262 draws the roller 256 to the position shown in FIG. 7, interrupting the continuity between resistors R244a and R244b and deenergizing trailer brakes 30.

Nonmagnetic separators 274 fixed to casing end member 234 act as stops limiting the downward movement of the roller so as to maintain a slight separation between permanent magnet 262 and the pole pieces 268 of permanent magnet 258 when roller 256 is in the position shown in FIG. 7, the deceleration sensor thus being held inactive. For the reasons discussed above in conjunction with the embodiment of deceleration responsive control illustrated in FIGS. 5 and 6, this arrangement is an important safety feature of the present invention in that it insures that the trailer brakes will properly function in the event of a failure in the stoplight circuit or in an emergency situation in which for some reason the brakes of the towing vehicle are not applied. Also, as discussed in conjunction with the foregoing embodiment of the present invention, such separation permits inertia to overcome the attractive force between permanent magnet 262 and pole pieces 263 and displace roller 256 to an operative position in the event that there is a substantial tilting of the trailer such as would occur in the case of a brake-away, for example. As in the case of control 34, sufficient attraction is retained to prevent roller 256 from moving forwardly and energizing the trailer brakes because the trailer hits a bump or is similarly jolted.

As shown in FIG. 7, casing 232 is provided with an opening 276. This is so that the casing may be filled with oil or other appropriate fluid to damp the movement of roller 256 and to reduce friction between conductive sleeve 264 and resistors R244a and b. An appropriate plug (not shown) may be provided to seal opening 276.

A third form of deceleration responsive control 280 embodying the principles of the present invention is illustrated in FIGS. 9 and 10. Like control 230, deceleration responsive control 280 may be substituted directly for control 34 in the control system 26 of FIG. 2, as will be apparent from a comparison of FIGS. 2 and 4.

Referring now to FIGS. 9 and 10, the control 280 includes a housing 282 with a removable cover 284. Fixed to the bottom wall 286 are a pair of parallel spaced apart standards 288 between which a platform or plate 290 is pivotally mounted on studs 292. Fixed to plate 290 by conductive mounting brackets 294 are a series of mercury switches S298a–f.

The mercury switches are conventional construction, including a tube 300 containing a pool of mercury 302 and conductive end caps 304a and b to one of which a contact 308 extending into tube 300 is fixed. When the mercury switch is tilted so that the pool of mercury extends between conductive end cap 204a and, contact 308, a circuit is completed between the two end caps 304a and 304b.

The conductive end caps are engaged by terminals 310a and 310b of bracket 294; and, as shown in FIGS. 4 and 9, the terminals of switch are connected through branch leads L312 and L314 to lead L50 and resistors R316a–f. The latter are wound on insulating members 318 fixed to platform 290 by screws 320 and nuts 322. The opposite ends of resistors R316a–f are connected to a terminal screw 324 together with lead L52.

From the foregoing and as shown in FIG. 4, it will be apparent that the six mercury switches S298a–f are connected in parallel between leads L50 and L52 and that each of the switches is connected in series with one of the six resistors R316a–f. Also, as shown diagrammatically in FIG. 4, successive resistors have a lower resistance than their predecessor. For example, resistor R316b has less resistance than resistor R316a, but greater resistance than resistor R316c. Accordingly, as succeeding ones of the switches S298a–f are closed, the resistance between leads L50 and L52 is decreased.

Fixed below platform 290 by the previously mentioned screws 320 and nuts 326 is a generally L-shaped stop 328 of magnetic material. With deceleration responsive control 280 deenergized, the lower end of stop leg 330 engages casing bottom wall 286, positioning the platform as shown in FIG. 9. With platform 290 thus positioned, all of the mercury switches S298a–f are open, and, accordingly, the circuit between leads L50 and L52 is open. As discussed above in conjunction with the embodiments of FIGS. 5 and 7, this provides an interruption in the trailer brake energizing circuit, and, accordingly, the brakes are not applied.

When brake pedal 28 of the towing vehicle 22 is depressed to apply the towing vehicle brakes, stoplight switch S40 is closed, as discussed previously. As shown in FIG. 4, this completes a circuit from one side of towing vehicle battery B44 through lead L42, stoplight switch S40, lead L38, an electromagnet 332 bolted or otherwise fixed to casing bottom wall 286, and leads L46 and L48 to the opposite side of the battery. This energizes electromagnet 332, which then attracts its armature formed by the stop leg 334, moving the latter in the direction shown by arrow 336 in FIG. 9 until the leg engages pole pieces 338 at the ends of the core of the electromagnet. This tilts mercury switches S298a–f to the extent that the first of these switches, S298a, closes, completing a circuit between leads L50 and L52 through resistor R316a. This energizes the brake-actuating circuit described previously, and the trailer brakes are applied. Since resistor R316a has the maximum resistance, minimum power is supplied to the brakes at this point, and, accordingly, there is a minimum braking effect.

Referring now especially to FIG. 10, the control 280 is mounted in trailer 24 so that arrow 340 faces the front of the trailer. Therefore, decelerative forces cause the pools of mercury 302 in these switches to surge forward, i.e., in a switch closing direction. Each succeeding switch is mounted at a greater inclination to the horizontal, and the magnitude of force required to close each successive switch is accordingly greater. Therefore, as the rate of deceleration of trailer 24 increases, successive switches are closed, reducing the resistance between leads L50 and L52 and, consequently, decreasing the resistance in the brake-actuating circuit and increasing the power supplied to brakes 30 and the braking effort. Conversely, as the rate of deceleration decreases, the pools of mercury flow toward the lower ends of the switches, and successive switches open to increase the resistance in the brake-actuating circuit and correspondingly decrease the braking effort. Therefore, the magnitude of application of trailer brakes 30 is automatically matched to the rate of deceleration of trailer 24 by deceleration responsive control 280.

When brake pedal 28 of towing vehicle 22 is released and there is no danger of trailer overrun, stoplight switch S40 opens, interrupting the circuit through and deenergizing electromagnet 332. Gravity then rocks platform 290 back to the position shown in FIG. 9, opening all of the mercury switches S298a–f and interrupting the trailer brake-actuating circuit.

In the event of a rapid deceleration of trailer 24, inertia will rock plate 290 in the direction of arrow 336 to initiate the braking cycle discussed above even though electromagnet 332 is not energized. As in the embodiments of the invention discussed previously, this is an important safety feature in that it insures that the trailer brakes will function in the event of a failure in the stoplight circuit or in an emergency situation in which for some reason the brakes of the towing vehicle are not applied. Similarly, in the case of a break-away or other situation resulting in a substantial tilting of the trailer, plate 290 will rock forward to a trailer brake-actuating position. However, mere bumps or irregularities in the surface over which the trailer is passing will not cause platform 290 to rock sufficiently far forward to apply the trailer brakes.

The fourth form of deceleration-responsive control 342 is illustrated in FIG. 12. Control 342 is identical to control 280 except that a single, multiple-contact mercury switch S344 is substituted for the switches S298a–f of the latter. Conductive end cap or terminal 346 of switch S344 is connected to lead L50, and the successive contacts S344c1–6 are connected to resistors R316a–f, respectively. Switch S344 is mounted on plate 290 by a suitable bracket 348, and the deceleration responsive control 342 is mounted in trailer 24 so that arrow 350 points toward the front of the trailer.

The operation of deceleration responsive control 342 parallels the operation of control 280. When brake pedal 28 of the towing vehicle 22 is depressed, closing stoplight switch S40, electromagnet 332 is actuated, rocking switch S344 in the direction indicated by arrow 352 until the pool of mercury 354 in switch envelope 356 extends between terminal 346 and contact S344c–1. This completes a circuit between leads L50 and L52 through resistor R316a which, as discussed above, results in application of the trailer brakes. As the rate of deceleration increases, inertia causes the pool of mercury 354 to flow forwardly in the upwardly curved envelope 356, connecting successive contacts S344c2, S344c6 to terminal 346. This progressively decreases the resistance in the brake-actuating circuit, producing braking efforts of increasing magnitude. Conversely, as the rate of deceleration decreases, the mercury flows back to the lower end of envelope 356, interrupting the circuits through the resistors R316a of lower value to progressively increase the resistance in the brake-actuating circuit and decrease the braking effort. By properly configuring switch envelope 356 and by mounting it at the correct inclination in trailer 24, the extent to which the trailer brakes are applied can be made to faithfully match the rate of deceleration of the trailer.

As in the case of deceleration responsive control 280, rapid deceleration of trailer 24 will cause platform 290 to rock forwardly until the pool of mercury connects terminals 346 to terminal S344c1 (and to succeeding terminals depending upon the rate of deceleration of trailer 24) as will tilting of the trailer to the extent that would occur in the event of a break-away or similar incident.

The deceleration sensor shown in FIGS. 14–17 is an improved form of the sensor 34 shown in FIGS. 2 and 5 and the corresponding parts are indicated by the same but primed reference numbers.

One end of the inertia member or arm 188' is fixed to a stud 184' upstanding from the bottom of the housing 180' and rotatably supporting in the bearing 182' to provide for swinging of the arm between the normal inactive or first position against the stop 226' as shown in FIG. 13 to a position of maximum acceleration shown in FIG. 14. The permanent magnet takes the form of a rectangular block extending across the free end of the arm 188' parallel to the arm axis and secured to the arm by a bracket 360. Weights 222' clamped against the arm by a nut 224' impart the proper inertia to the horizontal arm.

A clamping bolt 361 extending through the pole pieces 212' and the core 362 of the electromagnet coil 216' secures the parts to the side wall of the housing 180' with the pole pieces properly straddling the ends of the magnet 210' so that the arm is biased to and normally held by the permanent magnet in said first or inactive position when the coil 216' is deenergized and the vehicle deceleration is below the predetermined low rate above referred to. As before, the polarity of the electromagnet when the coil thereof is energized is the same as that of the permanent magnet so as to provide the proper repelling force for forcing the inertia roller away from the inactive position (FIG. 5). The end portion 188' of the arm is composed of non-magnetic material.

In this form, a variable resistance 363 controlling the energization of the trailer brakes is mounted on the housing 180' instead of on the arm as in FIG. 5 and coacts with a contact 364 of arcuate shape projecting laterally from the side of the arm near the pivot thereof and clamped by screws 365 against the side of the arm. The end of the contact adjacent the arm pivot is connected through a flexible conductor 366 and the lead L50 to the trailer brakes 30.

The resistance 363 is a single length of wire wound helically around a tube 367 in this instance, the tube being fulcrummed at one end on a pin 3608 upstanding from the bottom of the housing and laterally spaced from the central portion of the arm in the inactive position (FIG. 13) of the latter. A contractile spring 369 stretched between a projection 370 beyond the pivot 368 urges the tube counter-clockwise toward a stop 371 fixed to the housing and positioned to limit the swinging of the tube to a position (FIG. 13) in which the end turn 374 of the resistance coil 363 at the free end of the tube is disposed near but spaced a short distance 372 from the end of the contact 364 nearest the arm pivot 184', Through a flexible wire 373, the other end 375 of the resistance coil is grounded through the lead L52 and thus is connected to the negative battery B36 whose positive terminal is joined by the leads L64 and L52 to the windings of the trailer brakes.

Assuming that the tractor brakes are released and the vehicle is not decelerating, the parts of the sensor 34' will be positioned as shown in FIGS. 13 and 15, the trailer brakes being released by virtue of the opening of the stop switch 340 and the holding of the contact 364 separated from the resistance coil end 374 by the gap 372. In response to depression of the pedal 28 to apply the tractor brakes, the accompanying closure of the stop switch S40 completes the circuit for energizing the electromagnet 216' so that its polarity is the same as that of the permanent magnet thus creating flux which repels this magnet and moves the arm 188' far enough to bring the contact 364 into a second predetermined position in which the trailer brake circuit is closed by virtue of engagement with the end turn 374 of the resistance as shown in phantom in FIG. 13. With the closure of this circuit, the trailer brakes are applied to exert a low retarding force.

As the deceleration of the vehicle increases, the arm 188' swings counter-clockwise away from the said second or circuit closing position and the contact rolls along the resistance coil 363 while at the same time swinging the supporting tube clockwise about the axis 368 against the force of the spring 369. The point of engagement between the rigid contact 364 and the resistance wire thus progresses along the turns of the resistance wire so as to reduce progressively the resistance included in the trailer brake circuit. The energization of the trailer brakes is thus increased in proportion to the increase in the vehicle deceleration. This action may continue until the arm 188' reaches the position of maximum trailer brake application as shown in FIG. 14 in which substantially all of the resistance is cut out of the brake circuit by the time that the projection 370 on the tube 367 comes against a limit stop 376.

As the vehicle deceleration decreases, the force of the tensioned spring 369 swings the tube 367 counter-clockwise about the pivot 368 to balance the decreased inertia force. This motion of the tube is transmitted to the arm 188' as the resistance coil rolls along the contact 364 and until the tube comes against the stop 371 as shown in FIG. 13 as the arm 188' reaches the above mentioned second position. At this time, the tractor brakes are released, the stop switch is opened thereby deenergizing the electromagnet 216' thus subjecting the arm 188' to the biasing force of the permanent magnet 210' so as to swing the arm onwardly from the second position shown in phantom and to its normal position against the stop 226' shown in full in FIG. 13.

This form of the deceleration sensor is especially advantageous since the motions of all of the moving parts are horizontal and therefore not seriously effected by road shocks. Also, a single spring force, that of the spring 369, opposes the force developed by the weighted arm 188' during counter-clockwise swinging of the arm resulting from an increase in the vehicle deceleration above the value predetermined by the weighting of the arm, the same force, acting through the pivoted tube 367 and the contact 364, to swing the arm reversely as the deceleration derived force decreases. By utilizing the single spring force and by providing true rolling contact between the contact 364 and the resistance 363, the changes in the resistance value and therefore the energization of the trailer brakes correspond very closely to changes in the rate of vehicle deceleration above the predetermined value which initiates swinging of the arm 188' away from its position shown in phantom in FIG. 13.

OPERATION

It will be seen from the foregoing that in each of the forms above described, the deceleration sensor includes an inertia member, pivoted arm 188 or 188' (FIGS. 5 and 13), roller 264 (FIG. 7) platform 334 (FIG. 9) which is biased to and held in a first position against a stop 226, 226', 274 or 286 so that the sensor is not responsive to decelerations below a predetermined rate, the trailer brake energizing circuit thus being held open. However, when the tractor brakes are applied and the stop switch S40 closed, the electromagnet 216, 258, 338 or 216' is energized forcing the inertia member away from its stop to the second position which is shown in phantom in FIG. 13 thus rendering the sensor active to close the trailer brake energizing circuit through the battery B36 and the contact mechanisms above described. With a resistance of maximum value included in the circuit, the trailer brakes will be applied to produce a force of minimum value retarding the vehicle.

As the rate of deceleration increases, the inertia member is moved away from this second position against the spring or gravity bias, this movement and the increase in the energization of the trailer brakes thus being in proportion to the prevailing rate of vehicle deceleration. The reverse action takes place as the vehicle deceleration decreases to said second predetermined position of minimum trailer brake application. As the member reaches this position, the permanent magnet (FIGS. 5, 7, 9 or 13) becomes effective to move the member immediately against its stop and to said first position if at the time the tractor brakes are released and the electromagnet is thus deenergized.

As pointed out above, the force holding the inertia member in the inactive or first position is effective only at deceleration rates below said predetermined value. At higher decelerations, the holding force will be overcome by the deceleration force derived through the inertia member thus causing the member to be moved to said second position even though the circuit for energizing the electromagnet remains open by failure of the stop switch or interruption of the circuit at some other point. Thus, in such emergency or abnormal condition of the circuitry, the trailer brakes will be applied by the independent action of the deceleration sensor and to the same degree as during normal operation of the vehicle.

For such emergency protection and for normal operation it will be apparent that the deceleration sensor may be mounted on the tractor and the circuitry adapted for energization of the electromagnet from the tractor battery B44 Where, however, the deceleration sensor is to be used to apply the trailer brakes in the unusual event of the trailer breaking away from the tractor, a separate battery B36 is provided on the trailer, and the circuit for energizing the electromagnet is arranged as above described. The trailer brakes are thus applied in response to an increase in deceleration of the separated trailer or a change in its inclination resulting from the breakaway.

I claim:

1. In a vehicle comprising a tractor and a trailer coupled to the tractor and having electrically controlled trailer brakes,
   (a) a source of electric power on said vehicle,
   (b) a circuit adapted when closed to energize said trailer brakes, including a variable resistance,
   (c) an inertia member mounted on said vehicle for back and forth movement relative thereto in response to increases and decreases in rate of deceleration of the vehicle,
   (d) a stop adapted for abutment by said member to limit the movement thereof to a first predetermined position in the deceleration-decreasing direction, and
   (e) contact mechanism including coacting elements separated when said member is against said stop and engageable after movement of the member a short predetermined distance away from the stop to a second position to complete said circuit for energizing said trailer brakes and then reduce the value of said resistance as the member moves further away from said stop, said member, during engagement of said contact elements, being urged continuously toward said second position so as to return the member toward such position as the rate of deceleration of the vehicle decreases.

2. A trailer brake control system as defined in claim 1 including spring means yieldably opposing the movement of said member away from said second position with a force which increases in proportion to the increase in the rate of deceleration of said vehicle and the member is returned to said second position as the deceleration rate decreases.

3. A trailer brake control system as defined in claim 1 including means rendered effective when said member is returned to said second position in response to a decrease in the vehicle deceleration to bias the member further to said first position and hold the member yieldably against said stop.

4. A trailer brake control system as defined in claim 1 including means exerting on said inertia member a force for moving the member from said second position to said first position and holding the member releasably against said stop.

5. A trailer brake control system as defined in claim 4 in which said holding means comprises a permanent magnet and a magnetic element coacting therewith when said member is returned to said second position.

6. A trailer brake control as defined in claim 5 including an electromagnet adapted when energized to produce a flux which repels the permanent magnet so as to move said member away from said stop and to said second position.

7. A trailer brake control as defined in claim 6 including means operating as an incident to application of the brakes of said tractor to energize said electromagnet.

8. In a tractor-trailer vehicle having electrically controlled trailer brakes, a system for controlling the application of the trailer brakes comprising:
   (a) an electrical power source,
   (b) normally inoperative control means including:
      (1) a member displaceable from an inoperative position to connect said trailer brakes to the power source therefor,
      (2) means for normally maintaining said displaceable member in said inoperative position to interrupt the circuit between said trailer brakes and the power source therefor comprising a permanent magnet and a normally deenergized electromagnet adjacent said permanent magnet when said displaceable member is in its inoperative position, the like poles of said magnets being adjacent each other when said electromagnet is energized, whereby the repelling force between said magnets will move said displaceable member to its operative position to connect the trailer brakes to the power source therefor, and
      (3) sensing means responsive to the rate of deceleration of the trailer for connecting said power source to said trailer brakes and for so regulating the power supplied to said trailer brakes while the power source is connected thereto that the braking effect is proportional to said rate of deceleration, and
   (c) means responsive to the application of the tractor brakes to energize said electromagnet.

9. A trailer brake control system as defined in claim 8 including stop means providing a gap between the poles of said magnets when said displaceable member is in its inoperative position to reduce the force of attraction therebetween whereby decelerative forces above a predetermined magnitude will overcome the force of attraction between the magnets and move the displaceable member to its operative position to produce a braking effect by the trailer brakes even though said electromagnet is not energized by the application of the towing vehicle brakes.

10. A trailer brake control as defined in claim 8 in which said displaceable member is a horizontal arm mounted on the vehicle to swing freely about an upright axis and said permanent magnet is fixed to the arm, the pole pieces of said electromagnet being fixed on said vehicle.

11. A trailer brake control system as defined in claim 10 including a series of contacts carried by said arm for movement therewith, resistors of increasingly lower resistance connected to each of said contacts, a fixed contact adapted to be engaged and disengaged by successive ones of the contacts as the assembly is displaced away from and toward said inoperative position, and leads connecting said resistors and said fixed contact in series with said power source and said trailer brakes whereby the arm-carried contacts engaged with the fixed contact change to increase and decrease the resistance in the power source-trailer brake circuit as the rate of deceleration changes to produce a braking effort proportional to said rate of deceleration, and means for normally maintaining said arm-carried contacts out of engagement with said fixed contact to interrupt the circuit between the trailer brakes and the power source therefor and for displacing said arm sufficiently far from its normal position to engage the first arm-carried contact with the fixed contact and thereby produce a minimum braking by the trailer brakes substantially simultaneously with the application of the tractor brakes.

12. A trailer brake control system as defined in claim 1 in which said inertia member is a roller supported by a track extending along the line of travel of the vehicle and inclined upwardly from said stop in the direction of such travel, so that the roller rolls up and down said track away from and toward said second position in response to increases and decreases in the vehicle deceleration above a predetermined value, said brake circuit being interrupted when said roler is disposed in said first position.

13. A trailer brake control as defined in claim 12 including a casing surrounding said track and said roller and a body of liquid contained in said casing in continuous contact with the roller and acting to dampen the movements thereof relative to the track.

14. A trailer brake control system as defined in claim 12 including means normally maintaining said roller at the lower end of said track whereby the circuit between said power source and the trailer brakes is interrupted and for displacing said roller forwardly along said track to close said trailer brake circuit and produce at least a minimum braking effect by the trailer brakes substantially coincidentally with the application of the brakes of said tractor.

15. A trailer brake control as defined in claim 12 including a permanent magnet carried by said roller and rendered active by the return of the roller to said second position to draw the roller from said second to said first position.

16. A trailer brake control as defined in claim 15 in which said roller is moved from said brake-released first position to said second position in response to energization of an electromagnet overcoming the force of said permanent magnet.

17. A trailer brake control as defined in claim 16 in which said permanent magnet extends axially of said roller and the pole pieces of the core of said electromagnet straddle the ends of said permanent magnet when the latter is in said first position.

18. A trailer brake control as defined in claim 12 in which the lower end portion of said track between said first and second positions is of shallow slope and the slope of the lower end portion of the track above said second position is of greater slope.

19. A trailer brake control as defined in claim 18 in which said second end portion is curved and of increasing slope.

20. A trailer brake control as defined in claim 12 in which said track is formed by two laterally spaced rails contacted, during rolling of the roller along the track, by opposite ends of the conductive surface of said roller.

21. A trailer brake control as defined in claim 20 in which both of said rails are electrically conductive and electrically connected by engagement with said roller, the conductive surface of at least one of said rails being a resistance element whose effective length is decreased progressively as said roller rolls upwardly along said track.

22. A trailer brake control as defined in claim 21 in which said rails are connected by said roller surface and interposed in series relation in said trailer brake energizing circuit so that the value of said resistance decreases progressively as the roller rolls up the inclined track.

23. A trailer brake control as defined in claim 22 in which said resistance is a coil of wire extending along one of said rails.

24. A trailer brake control as defined in claim 20 including guide means extending along and disposed above said rails and engageable with said roller to maintain contact between the roller and rails in all positions of the roller along the rails above said second position.

25. A trailer brake control as defined in claim 24 including a flange on said roller coacting with said guide means to position the roller axially during rolling thereof along said rails.

26. A trailer brake control system as defined in claim 1 in which said inertia member comprises a switch platform pivotally mounted on the vehicle to swing about a horizontal axis extending transversely thereof and gravity urged to a normally inactive position against said stop but movable progressively away from the stop as the rate of deceleration of the vehicle increases and said control includes a series of mercury switches mounted on said platform so as to be closed successively as the vehicle deceleration increases above a predetermined value, and means operable automatically to increase the energization of said trailer brakes as increasing numbers of said switches become closed.

27. A trailer brake control as defined in claim 26 including an electromagnet adapted when energized to swing said switch platform from said first to said second position and when deenergized to allow the platform to return by gravity to said first position.

28. A trailer brake control as defined in claim 1 in which said variable resistance is carried by and extends along a second arm mounted on said vehicle to swing about an upright axis and is engageable with a contact fixed to and facing laterally from the side of said first arm.

29. A trailer brake control as defined in claim 28 in which said variable resistance is a helical coil of wire encircling said second arm and presenting a line for engagement by said contact to reduce the length of the wire in said brake energizing circuit as said first arm is swung away from said second position.

30. A trailer brake control as defined in claim 1 in which said inertia member is an arm mounted on said vehicle to swing about an upright axis away from and toward said second position as the deceleration of the vehicle increases and decreases relative to a predetermined value, and said resistance is secured to and extends along a second arm mounted adjacent one end of the resistance for swinging of the free end toward and away from the pivoted end portion of said member, a contact fixed to the side of said member and adapted for rolling contact with successive points along said resistance, a second stop engageable with said second arm to limit the swinging thereof to a third predetermined position in which the free end of said resistance is spaced laterally from said contact when said member is in said first position, spring means urging said second arm to the latter position.

31. A trailer brake control as defined in claim 30 in which said contact is arcuate in curvature and thus adapted to roll along said resistance as said second arm is swung away from said second stop by said member in moving away from said second position in response to an increase in the deceleration of said vehicle.

32. In a vehicle comprising a tractor and trailer coupled to the tractor and having tractor brakes selectively controllable by the vehicle operator and electrically controlled trailer brakes, the combination of:

(a) a source of electric power on said trailer,
(b) a device for sensing deceleration of said vehicle and adapted when activated to energize said trailer brakes from said source to a degree proportional to the prevailing rate of deceleration of the vehicle,
(c) means operable during normal travel of said vehicle for holding said device inactive at deceleration rates below a predetermined value but activating the device when the deceleration rate of the vehicle exceeds such value whereby to effect energization of said trailer brakes from said source to a degree proportional to the prevailing deceleration rate of the vehicle and independently of the application of said tractor brakes and therefore whenever the trailer breaks away from the tractor,
(d) an electromagnet which is deenergized during normal travel of said vehicle but which, when energized, causes energization of said trailer brakes from said source to a degree corresponding to the prevailing rate of deceleration of the vehicle, and
(e) means for energizing and deenergizing said electromagnet while said tractor brakes are applied and released respectively.

33. A tractor-trailer brake control as defined in claim 32 in which said sensing device includes an inertia member mounted on the trailer and movable away from and back toward a normal position with increases and decreases in the vehicle deceleration, and means exerting on said member a force normally and releasably holding the same in said position, said electromagnet when energized exerting on said member a force overcoming said normal force to effect release of the member and movement thereof away from said normal position and thereby render said device active in controlling the degree of energization of the trailer brakes.

34. In a vehicle comprising a tractor and a trailer coupled to the tractor and having tractor brakes selectively controllable by the vehicle operator and electrically controlled trailer brakes, the combination of:

(a) a source of power on said vehicle, (b) a device for sensing deceleration of said vehicle and adapted when activated to energize said trailer brakes from said power source to a degree proportional to the prevailing rate of deceleration of the vehicle, said device including an inertia member mounted on the trailer and movable away from and back toward a normal position with increases and decreases in the vehicle deceleration relative to a predetermined value, (c) an electromagnet which is deenergized during normal travel of said vehicle but which, when energized, activates said device to cause energization of said trailer brakes to a degree corresponding to the prevailing rate of deceleration of the vehicle, (d) means for maintaining said electromagnet energized and deenergized while said tractor brakes are applied and released respectively, and (e) means continuously acting during the movements of said member away from said normal position thereon to exert a substantially constant force yieldably resisting and thereby damping movement of the member.

35. A tractor-trailer brake control as defined in claim 34 in which said damping means is a viscous liquid in an enclosure surrounding a part movable with said member.

36. A tractor-trailer brake control as defined in claim 35 in which said inertia member is disposed within an enclosure filled with a viscous liquid.

37. A tractor-trailer brake control as defined in claim 36 in which said member is a roller which is disposed within said enclosure and, in response to increases and decreases in the deceleration rate of said vehicle, rolls up and down a track immersed in said liquid.

References Cited

UNITED STATES PATENTS

| | | | |
|---|---|---|---|
| 2,802,204 | 8/1957 | Kennelly et al. | 200—61.45 X |
| 2,834,434 | 5/1957 | Stuart | 188—3 |
| 2,987,147 | 6/1961 | Mitchell et al. | |
| 3,034,598 | 5/1962 | Lafaye | 188—3 |
| 3,053,348 | 9/1962 | Stair. | |
| 3,135,358 | 6/1964 | Greentree | 188—3 |
| 3,188,463 | 6/1965 | Hines | 303—24 X |

MILTON BUCHLER, Primary Examiner

J. J. McLAUGHLIN, Jr., Assistant Examiner

U.S. Cl. X.R.

180—103; 188—3; 200—61.48; 303—3, 24; 335—234